US006847045B2

(12) United States Patent
Ossipov et al.

(10) Patent No.: US 6,847,045 B2
(45) Date of Patent: Jan. 25, 2005

(54) HIGH-CURRENT AVALANCHE-TUNNELING AND INJECTION-TUNNELING SEMICONDUCTOR-DIELECTRIC-METAL STABLE COLD EMITTER, WHICH EMULATES THE NEGATIVE ELECTRON AFFINITY MECHANISM OF EMISSION

(75) Inventors: Viatcheslav V. Ossipov, Madrid (ES); Alexandre M. Bratkovski, Mountain View, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 74 days.

(21) Appl. No.: 09/975,297

(22) Filed: Oct. 12, 2001

(65) Prior Publication Data

US 2003/0071256 A1 Apr. 17, 2003

(51) Int. Cl.[7] .......................... H01L 29/06; H01L 29/12
(52) U.S. Cl. .............................. 257/10; 257/87; 257/89; 257/199; 257/589; 257/600; 257/603; 257/618; 257/653
(58) Field of Search .......................... 257/10, 199, 87, 257/89, 589, 600, 603, 618, 653

(56) References Cited

U.S. PATENT DOCUMENTS

| | | | | | |
|---|---|---|---|---|---|
| 3,845,296 | A | * | 10/1974 | Schnitzler | 250/214 VT |
| 3,931,633 | A | * | 1/1976 | Shannon et al. | 257/10 |
| 3,959,037 | A | * | 5/1976 | Gutierrez et al. | 257/10 |
| 4,325,084 | A | * | 4/1982 | van Gorkom et al. | 348/796 |
| 4,516,146 | A | * | 5/1985 | Shannon et al. | 313/346 R |
| 4,633,279 | A | * | 12/1986 | Hipwood | 257/26 |
| 5,077,597 | A | * | 12/1991 | Mishra | 257/96 |
| 5,126,287 | A | * | 6/1992 | Jones | 438/20 |
| 5,140,400 | A | * | 8/1992 | Morishita | 257/197 |
| 5,329,141 | A | * | 7/1994 | Suzuki et al. | 257/103 |
| 5,557,596 | A | | 9/1996 | Gibson et al. | 369/101 |
| 5,599,749 | A | | 2/1997 | Hattori et al. | 437/228 |
| 5,619,092 | A | | 4/1997 | Jaskie | 313/309 |
| 5,665,994 | A | * | 9/1997 | Palara | 257/378 |
| 5,679,966 | A | * | 10/1997 | Baliga et al. | 257/139 |
| 5,908,699 | A | * | 6/1999 | Kim | 428/408 |
| 5,932,962 | A | | 8/1999 | Nakatani et al. | 313/495 |
| 5,936,257 | A | * | 8/1999 | Kusunoki et al. | 257/10 |
| 5,952,680 | A | * | 9/1999 | Strite | 257/88 |
| 5,952,772 | A | * | 9/1999 | Fox et al. | 313/310 |
| 5,985,708 | A | * | 11/1999 | Nakagawa et al. | 438/206 |

(List continued on next page.)

OTHER PUBLICATIONS van Gorkom et al., Performance of Silicond Cold Cathodes, Journal of Vacuum Science & Technology, B 4(1) Jan./Feb. 1986, pp. 108–111.*

(List continued on next page.)

Primary Examiner—Amir Zarabian
Assistant Examiner—Ida M. Sorrow

(57) ABSTRACT

A cold electron emitter may include a heavily a p-doped semiconductor, and dielectric layer, and a metallic layer (p-D-M structure). A modification of this structure includes a heavily n+ doped region below the p region (n+-p-D-M structure). These structures make it possible to combine high current emission with stable (durable) operation. The high current density is possible since under certain voltage drop across the dielectric layer, effective negative electron affinity is realized for the quasi-equilibrium "cold" electrons accumulated in the depletion layer in the p-region next to the dielectric layer. These electrons are generated as a result of the avalanche in the p-D-M structure or injection processes in the n+-p-D-M structure. These emitters are stable since they make use of relatively low extracting field in the vacuum region and are not affected by contamination and absorption from accelerated ions. In addition, the structures may be fabricated with current state-of-the-art technology.

25 Claims, 5 Drawing Sheets

U.S. PATENT DOCUMENTS

| | | | |
|---|---|---|---|
| 6,040,587 A * | 3/2000 | Kishino et al. | 257/11 |
| 6,153,014 A * | 11/2000 | Song | 134/2 |
| 6,187,603 B1 | 2/2001 | Haven et al. | 438/20 |
| 6,204,595 B1 | 3/2001 | Falabella | 313/308 |
| 6,242,770 B1 * | 6/2001 | Bronner et al. | 257/295 |
| 2001/0017515 A1 * | 8/2001 | Kusunoki et al. | 313/496 |
| 2001/0020733 A1 * | 9/2001 | Sasaguri | 257/653 |
| 2002/0014705 A1 * | 2/2002 | Ishio et al. | 257/784 |
| 2002/0033536 A1 * | 3/2002 | Koh et al. | 257/758 |
| 2002/0176349 A1 * | 11/2002 | Gibson et al. | 369/126 |

OTHER PUBLICATIONS

G.G.P. van Gorkom et al., "Performance of Silicon Cold Cathodes", Sep. 30, 1985, J. Vac. Sci. Technol. B 4(1), Jan./Feb. 1986, pp. 108–111.

A.M.E. Hoeberechts et al., "Design Technology, and Behavior of a Silicon Avalanche Cathode", Oct. 8, 1985, J. Vac. Sci. Technol. B 4(1), Jan./Feb. 1986, pp. 105–107.

E.A. Hijzen et al., "Avalanche Cold Cathodes with 10% Emission Efficiency", Sep. 8–10, 1988, ESSDERC'98 Proceedings of the 28th European Solid–State Device Research Conference, pp. 584–587.

Yokoo et al., "Experiments of highly emissive metal–oxide–semiconductor electron tunneling cathode", May/Jun. 1996, J. Vac. Sci. Technol. B 14(3), 1996 American Vacuum Society, pp. 2096–2099.

Akinwande, A.I. et al., "GaN Solid State Electron Emitter", Technical Digest of IVMC'97, Kyongiu, Korea 1997, pp. 602–607.

Lee, W.S. et al., "A Study on the Diamond Cold Cathode in FED", Asia Display 98, pp. 681–684.

Komoda et al., "Mechanism of efficient and stable surface-emitting cold cathode based on porous polycrystalline silicon films", May/Jun. 1999, J. Vac. Sci. Technol. B 17(3), 1999 American Vacuum Society, pp. 1076–1079.

* cited by examiner

HIGH-CURRENT AVALANCHE-TUNNELING AND INJECTION-TUNNELING SEMICONDUCTOR-DIELECTRIC-METAL STABLE COLD EMITTER, WHICH EMULATES THE NEGATIVE ELECTRON AFFINITY MECHANISM OF EMISSION

RELATED APPLICATIONS

The following application of the common assignee, which is hereby incorporated by reference in its entirety, may contain some common disclosure and may relate to the present invention:

U.S. patent application Ser. No. 09/974,818, entitled INJECTION COLD EMITTER WITH NEGATIVE ELECTRON AFFINITY BASED ON WIDE-GAP SEMICONDUCTOR STRUCTURE WITH CONTROLLING BASE

FIELD OF THE INVENTION

This invention relates generally to electron emitters. In particular, the invention relates generally to cold electron emitters of p-n cathode type.

BACKGROUND OF THE INVENTION

Electron emission technology exists in many forms today. Hot cathode ray tubes (CRT), where electrons are produces as a result of thermal emission from hot cathode heated by electrical current, are prevalent in many displays such as televisions (TV) and computer monitors. Electron emission also plays a critical role in devices such as x-ray machines and electron microscopes. Miniature cold cathodes may be used for integrated circuits and flat display units. In addition, high-current density emitted electrons may be used to sputter or melt some materials.

In general, two types of electron emitters exist—"hot" and "cold" cathode emitters. The "hot" cathodes are based on thermal electron emission from surface heated by electric current. The cold cathodes can be subdivided into two different types: type A and B. The emitters of type A are based on the field emission effect (field-emission cathodes). The emitters of type B are the p-n cathodes using the emission of non-equilibrium electrons generated by injection or avalanche electrical breakdown processes.

Both types of emitters have drawbacks, which make them virtually impractical. For type A emitters (field emission type), one of the main drawbacks is the very short lifetime of such emitters. For example, the type A emitters may be operational for just hours, and perhaps even as short as minutes. In the cold field-emission cathodes (type A), electrons are extracted from the surface of a metal electrode by a strong electric field in vacuum. The field cathodes have a short lifetime at large emitted currents, which are needed in recording devices and other applications.

With reference to FIG. 1A, operation of type A emitters will be described. FIG. 1A illustrates a typical energy diagram for a metallic surface illustrating a concept of a work function of a metal. As shown, a material, in this instance a metal, is on the left and a vacuum region is on the right. $E_F$ represents a Fermi level of the metal. The work function of the metal $\Phi_M$ is the energy required to move a single electron from the Fermi level in the metal into vacuum. Thus, the work function $\Phi_M$ is the difference between Vac and $E_F$. The work function $\Phi_M$ for metal is typically between 4–5 electron volts (eV).

In very strong external field the energy diagram changes, and behaves as a triangular potential barrier for the electrons (FIG. 1A, dashed line). When the external field F increases, the barrier width decreases and the tunneling probability for electrons rapidly increases. The transparency of such a barrier is $$D = \exp\left[-\frac{4\Phi_M^{3/2}\sqrt{2m}}{3qhF}\right],$$

where F the electric field, q and m are the electron charge and mass. Transparency represents the probability of electron tunneling through the barrier. For current densities $j=1-100$ A/cm$^2$ (amperes per square centimeter) the corresponding field would be $F>10^7$ V/cm.

In such strong fields, the ions, which are always present in a vacuum region in actual devices, acquire the energy over $10^3$ eV in the vacuum region on the order of one micron or larger. Ions with such strong energies collide with the emitter surface leading to absorption of the ions and erosion of the emitter surface. The ion absorption and erosion typically limits the lifetime of type A emitters to a few hours of operation or even to a few minutes. Damage to cathodes in systems with the fields of similar strength has been studied in great detail and is rather dramatic.

For type B emitters (injection/avalanche type), one of the main drawbacks is that the efficiency is very small. In other words, the ratio of emitted current to the total current in the circuit is very low, usually much less than 1%. The cathode of type B based either on p-n junctions, or semiconductor-metal (S-M) junction including $TiO_2$ or porous Si, or the avalanche electrical breakdown need an "internal" bias, applied to p-n junction or S-M junction.

Alternatively, there have been suggestions to use the electrical breakdown processes to manufacture the cold emitters from Si. These types of avalanche emitters are based on emission of very hot electrons (with energies of the order of a few electron volts) accelerated by very strong electric field in the avalanche regime. As a result, they also have a disadvantage that the emitted current density of the hot electrons is very small.

Attempts have been made to increase the current density by depositing cesium (Cs) on semiconductor surface to use a negative electron affinity (NEA) effect. FIG. 1B illustrates the concept of NEA. As shown, a material, a p-type semiconductor in this instance, is on the left and a vacuum region is on the right. $E_C$ represents a conduction band of the metal. Note that the NEA effect corresponds to a situation when the bottom of the conduction band $E_C$ lies above the vacuum level Vac. One earlier p-n cathode of this type combined a silicon, or gallium arsenide avalanche region, with cesium metallic layer from where the emission took place (GaAs/Cs or GaP/Cs structures). However, Cs is a very reactive and volatile element. Thus, the GaAs and GaP emitters with Cs are not stable at high current densities.

In short, cold emitters with both high current emission and stability were not possible with previous designs.

SUMMARY OF THE INVENTION

In one respect, an embodiment of a cold electron emitter may include doped p-type region. The p region may be formed from semiconductors such as Si. The cold electron emitter may also include a substrate below the p region. Indeed, the p region may be formed by doping the substrate with electron poor materials.

Alternatively, the electron emitter may include an n+ region formed above the substrate, in which the n+ region is formed by doping the substrate with electron rich materials.

The p region may then be formed by epitaxial growth of p-doped semiconductor layer on top of n+ region. The thickness of the p region is preferred to be less than the diffusion length of the electrons in the p region. When both the n+ region 220 and the p region 230 exist, the hole concentration in the p region is preferred to be less than the electron concentration in the n+ region.

The electron emitter may further include a dielectric layer formed above the p region. The thickness of the dielectric layer is preferred to be less than 2–3 nm and a breakdown field of the dielectric layer is greater than the applied electric field in the dielectric layer. The emitter may still include a metallic layer formed above the dielectric layer. The thickness of the metallic layer is preferred to be less than the mean free path for electron energy. The electron emitter may yet further include electrodes to n and p regions so that n+-p junction may be properly biased for operation. The electron emitter may still yet further include an M electrode, with or without the p electrode, to control the amount of current emitted from the current emitter.

In another respect, an embodiment of a method to fabricate an electron emitter may include forming a p region, for example, from doping a substrate with electron poor materials. The method may also include forming a p region on top of an n+ region, for example, by epitaxial growth of semiconductor doped with electron poor materials. The thickness of the p region is preferred to be less than the diffusion length of the electrons in the p region. Also, the hole concentration level in the p region is preferred to be less than the electron concentration of the n+ region if both n+ and p regions exist. The method may further include forming a dielectric layer above the p region and forming a metallic layer above the dielectric layer. The thickness of the metallic layer is preferred to be less than the mean free path for electron energy. The method may yet include forming n and p electrodes. The method may yet further include forming an M electrode, with or without forming the p electrode, to control the amount of current emitted from the current emitter.

The above disclosed embodiments of the present invention may be capable of achieving certain aspects. For example, the electron emitter may emit high density of electrons. Also, the lifetime of the emitter may be relatively high. Further, the emitter may be based on well-known materials (Si, $SiO_2$, Au etc.) and fabrication methods there of and thus, little to no capital investment is required beyond that present in the current state-of-the-art. In addition, the detrimental effects of field emitters—cathode surface erosion, ion absorption at the emitter surface, etc.—may be avoided since the device does not require strong electric fields resulting in stable operation. Thus stability and high current density may be combined in a single device.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structure have not been described in detail so as not to unnecessarily obscure the present invention.

Figure 1A:
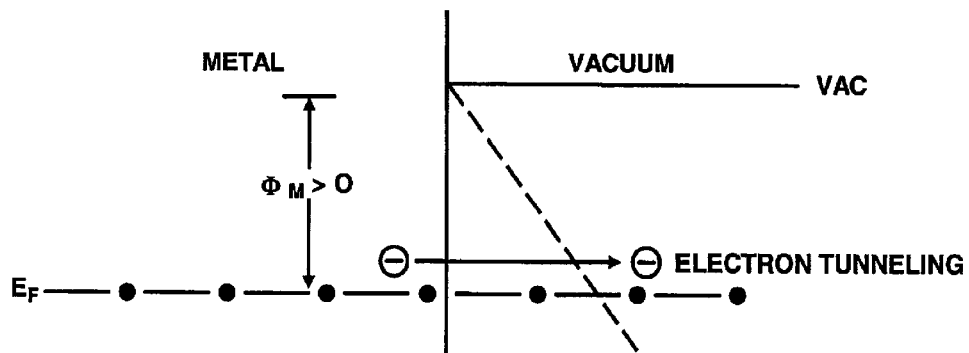
FIG. 1A is a graph of a typical energy diagram for a material surface illustrating a concept of a work function of the material.
Figure 1B:
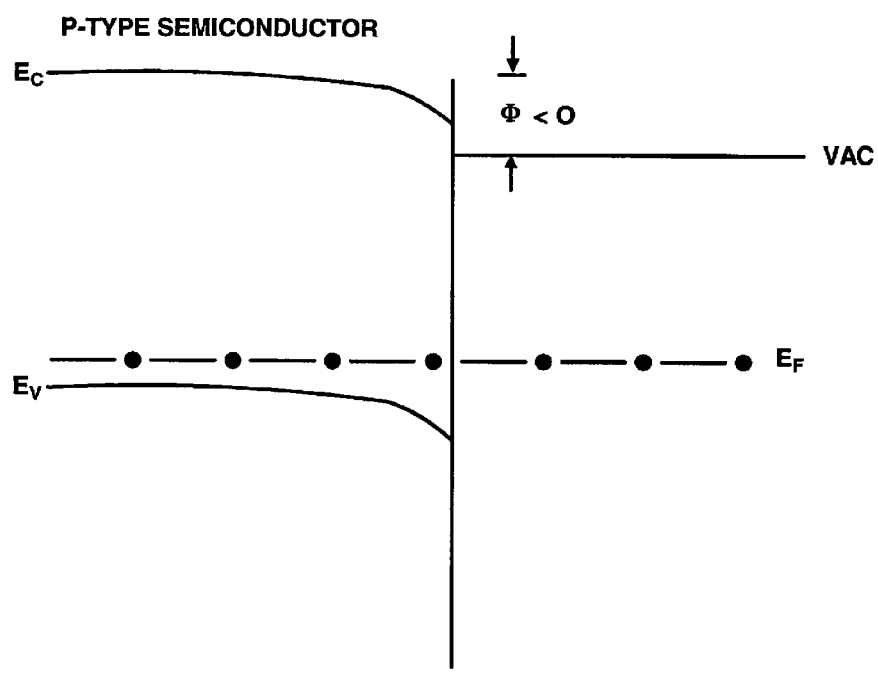
FIG. 1B is a graph of an energy diagram illustrating a concept of a negative electron affinity of a material.
Figure 2A:
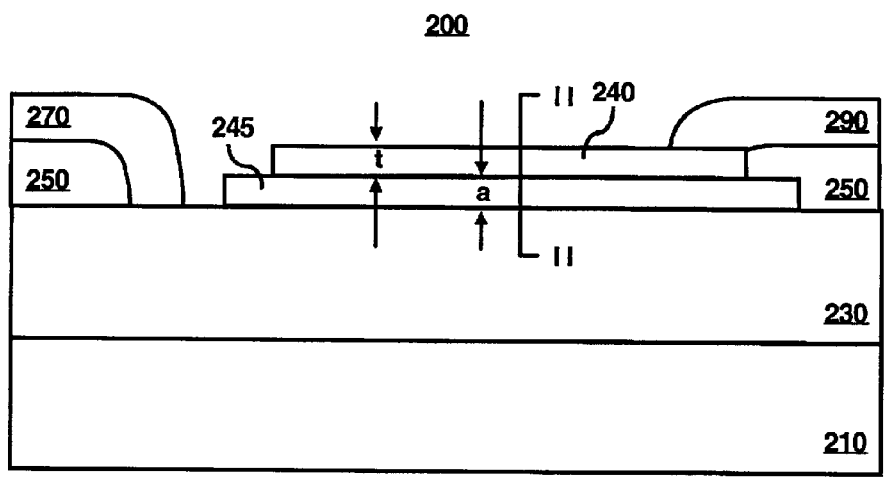
FIGS. 2A–2C illustrate exemplary cross sections of various embodiments of a cold emitter according to an aspect of the present invention.

FIG. 2A illustrates an exemplary cross section of a first embodiment of a cold emitter 200 according to an aspect of the present invention. The cold emitter 200 may generally be characterized as having an p-D-M structure due to the presence of a p region 230, dielectric layer 245, and a metallic layer 240. As shown in FIG. 2A, the cold emitter 200 may include a substrate 210 and the p region 230 formed above the substrate 210. The p region 230 may be formed from a semiconductor, for which Si is the preferred material. The p region 230 may also be formed from wider band gap semiconductors. Examples of such semiconductors include Ge, GaAs, GaP, InP, and InGaP. One of ordinary skill in the arts would recognize that other materials may be used as suitable semiconductors. The hole concentration in the p region 230 is preferably on the order between $10^{16}/cm^3$ and $10^{19}$ $cm^3$. However, depending on the types of applications, the concentration levels may be adjusted.

Indeed the substrate 210 and the p region 230 may be formed from the same semiconductor, e.g. Si. The p region 230 may then be formed by doping the semiconductor with electron poor materials. Examples of the electron poor materials include boron. Again, one of ordinary skill in the arts would recognize that other electron poor materials may be used.

The cold emitter 200 may further include the dielectric layer 245 formed above the p region 230. The dielectric layer 245 may be formed from materials such as $SiO_2$, $Al_2O_3$, and the like. One of ordinary skill in the arts would recognize that other materials may be suitable for the dielectric layer 245. It is preferred that the thickness 'a' of the dielectric layer 245 substantially meets the condition 1.5 nm$\leq$a$\leq$2 nm (nanometer). It is also preferred that the dielectric breakdown field $F_b$ of the dielectric layer 245 substantially meets the condition $F_b \geq (1.5-2)*10^7$ V/cm (volts per centimeter), for reasons explained later.

The cold emitter 200 may still further include the metallic layer 240 formed above the dielectric layer 245. The metallic layer 240 may be formed from conductive materials. Examples of conductive materials include Au, Ag, Al, Gd, W, Pt, Ir, Pd, and alloys thereof. One of ordinary skill would recognize that other materials maybe suitable as metallic layer 240, and the layer 240 may not be limited strictly to metals. Preferably, the thickness t of the metallic layer 240 is less than the mean free path $l_e$ for electron energy.

Typically, $l_e$ ranges between 2–5 nanometers (nm). Thus, the thickness 't' should satisfy the condition t<2–5 nm.

The electron cold emitter 200 may yet include a p electrode 270 and an M electrode 290 formed above the p region 230. The p electrode 270 may be electrically connected to the p region 230 and the M electrode 290 may be electrically connected to the metallic layer 240. The p and M electrodes, 270 and 290 respectively, may be formed from conductive materials. Examples of conductive materials include Au, Ag, Al, W, Pt, etc. and alloys thereof.

In addition, the electron emitter 200 may include an insulator 250 to insulate the p and M electrodes, 270 and 290 respectively. Indeed, the dielectric layer 245 and the insulator 250 may be one and the same or may be separate.

Figure 3A:
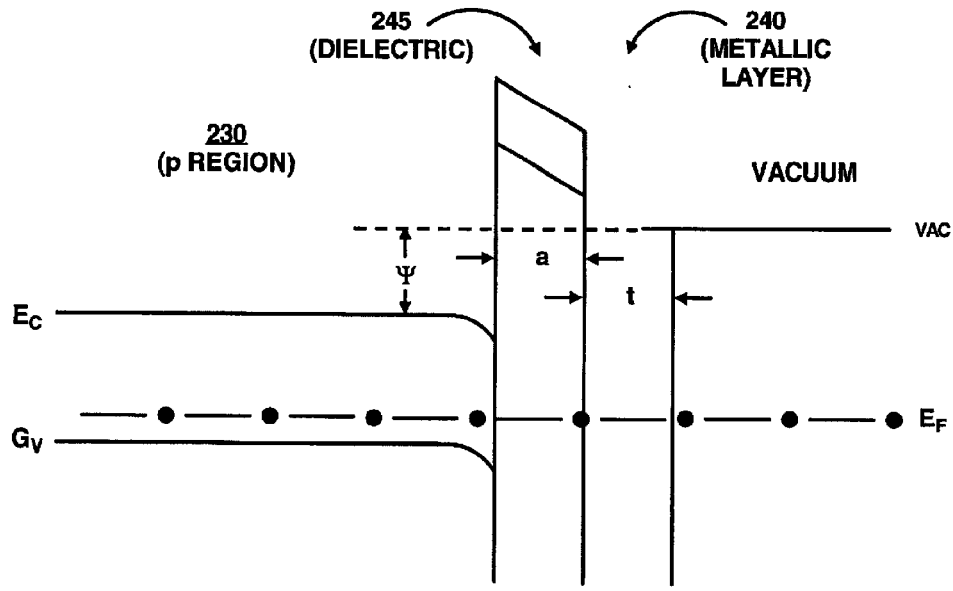
FIG. 3A illustrates an exemplary energy band diagram in equilibrium across the line II—II of the embodiment of the cold emitter with p-D-M structure shown in FIG. 2A.
Figure 4A:
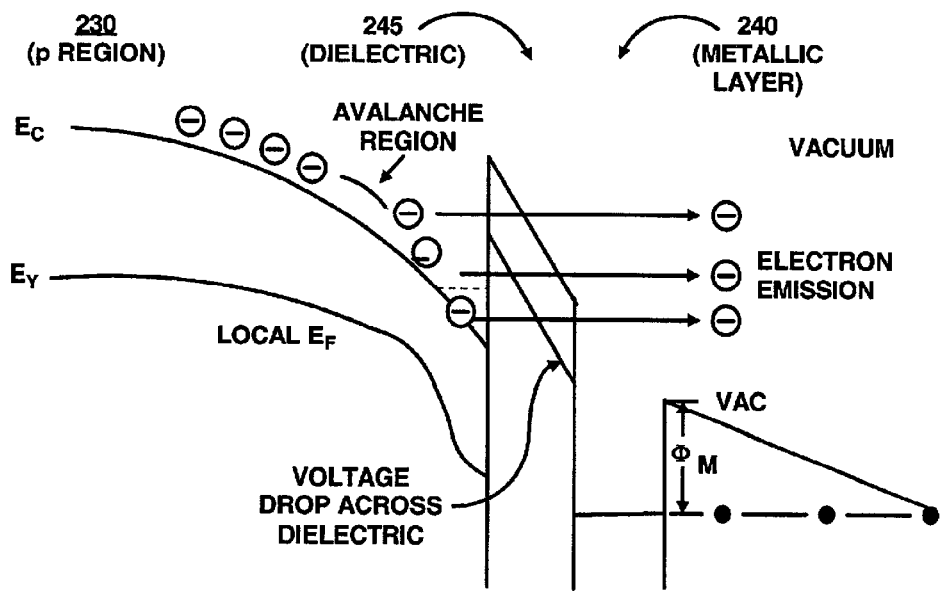
FIG. 4A illustrates an exemplary energy band diagram under bias across the line II—II of the embodiment of the cold emitter shown in FIG. 2A.

The operation of the cold emitter 200 of FIG. 2A will be described with references to FIGS. 3A and 4A. FIG. 3A illustrates an exemplary energy band diagram in equilibrium across the line II—II of the embodiment of the cold emitter 200 shown in FIG. 2A. At equilibrium, the bottom of the conduction band energy $E_C$ of the p region 230 lies below the vacuum level Vac by the value $\Psi$, which is typically about 3 electron volts (eV). Because the conduction energy $E_C$ is below that of vacuum level Vac, there is no NEA.

The effective NEA may be realized by applying a finite bias voltage. When the potential on the metallic layer 240 is positive relative to the potential applied to the p region 230, the main voltage drop occurs across the dielectric layer 245 as shown in FIG. 4A. When this happens, the bottom of the conduction band energy $E_C$ may move upward with respect to the vacuum energy level Vac.

At some bias voltage, the value of $E_C$ may become higher than the value of Vac. If the thickness 'a' of the dielectric layer 245 is sufficiently small, electrons may tunnel through the dielectric layer 245 and pass through the metallic layer 240, and effective NEA may be realized. For the electrons to tunnel through the dielectric layer, the breakdown field $F_b$ (not shown) of the dielectric layer 245 must be greater than the electric field $F_O$ (also not shown), i.e. $F_b > F_O$, where $F_O = \Psi/a$. Thus if $\Psi \approx 3$ eV and 'a' substantially meets the condition $1.5 \text{ nm} \leq a \leq 2$ nm, then the dielectric breakdown field $F_b$ of the dielectric layer 245 should substantially meet the condition $1.5*10^7$ V/cm $\leq F_b \leq 2*10^7$ V/cm.

The electric field in the semiconductor p region 230 may be represented as $F_S = F_O (\epsilon_D/\epsilon_S)$ (not shown), wherein $\epsilon_D$ and $\epsilon_S$ represent dielectric constants of the dielectric layer 245 and the semiconductor p region 230, respectively. If the conditions stated above are met, then the field $F_S$ exceeds the breakdown field of the semiconductor at all doping levels and avalanche breakdown occurs in the semiconductor p region 230. Electrons generated during the avalanche breakdown accumulates in a depletion region next to the dielectric layer 245 until the local quasi-Fermi level of the electrons rises above the vacuum level Vac. At this point, electron emission occurs. Because very little portion of the tunneling electrons slips into the external circuit, the efficiency of the cold emitter may be relatively high, for example greater than 10%.

Figure 2B:
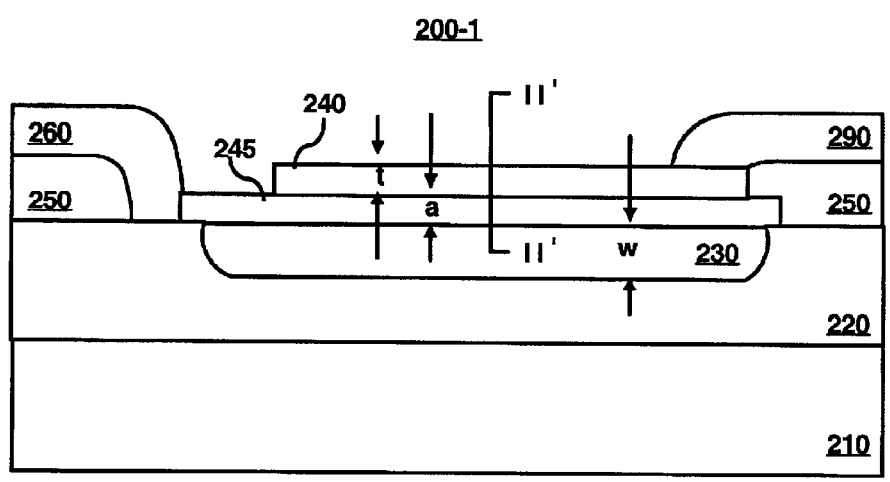

FIG. 2B illustrates an exemplary cross sections of a second embodiments of a cold emitter 200-1 according to an aspect of the present invention. The cold emitter 200-1 may be described as a variation on the cold emitter 200 of FIG. 2A, and may generally be characterized as an n+-p-D-M structure due to the presence of an n+ region 220. As shown in FIG. 2B, the cold emitter 200-1 includes most of the elements of the cold emitter 200 shown in FIG. 2A, but lacks the p conductor 270 and includes an n conductor 260. For sake of simplicity, elements common to both cold emitters 200 and 200-1 will not be described in detail. It suffices to note that the behavior and the characterizations of the common elements may be similar.

The cold emitter 200-1, in addition to some of the elements of the cold emitter 200, may also include the n+ region 220 formed above the substrate 210. The n+ region 220 and p region 230 may be formed from the same semiconductor such as Si. Alternatively, the p region 230 may be formed from a wider band gap semiconductor than Si, examples of which were listed above. One of ordinary skill in the arts would recognize that other materials may be used as suitable semiconductors. The electron concentration in the n+ region 220 is preferably near or above $10^{17}$–$10^{19}$/$cm^3$, and the electron concentration preferably exceeds the hole concentration in p region. However, depending on the types of applications, the concentration levels may be adjusted. Also, it is preferred that the electron concentration in the n+ region 220 be greater than the hole concentration of the p region 230.

Indeed the substrate 210 and the n+ region 220 may be formed from the same semiconductor. The n+ region 220 may then be formed by doping the semiconductor substrate 210 with electron rich materials. Examples of the electron rich materials include arsenic (As), antimony (Sb), phosphorous (P), and nitrogen (N). Again, one of ordinary skill in the arts would recognize other electron rich materials may be used.

The cold emitter 200-1 may further include the n conductor 260 electrically connected to the n+ region 220.

Note that the p region 230, instead of being directly above the substrate 210 as shown in FIG. 2A, may be formed within the n+ region 220 as shown in FIG. 2B. The p region 230 may be formed, for example, by counter doping the n+ region 220 with electron poor materials. An example of such materials includes boron. The p region 230 may also be formed from entirely separate materials than the n+ region 220. It is preferred that the n+ region 220 be formed from a wider band gap material than the p region 230.

It was noted above that the ratio of the electron concentration in the n+ region 220 to the hole concentration in the p region 230 be greater than unity. The ratio may be as much as 10 or more. Again, like the electron and hole concentration levels, the ratio may be varied as well, depending on the types of application. In addition, W is preferred to be less than L, where W represents the thickness of the p region 230 and where L represents diffusion length of the non-equilibrium electrons in the p region 230, shown in FIG. 2B. The diffusion length L is typically about 0.3–1 $\mu$m.

Figure 3B:
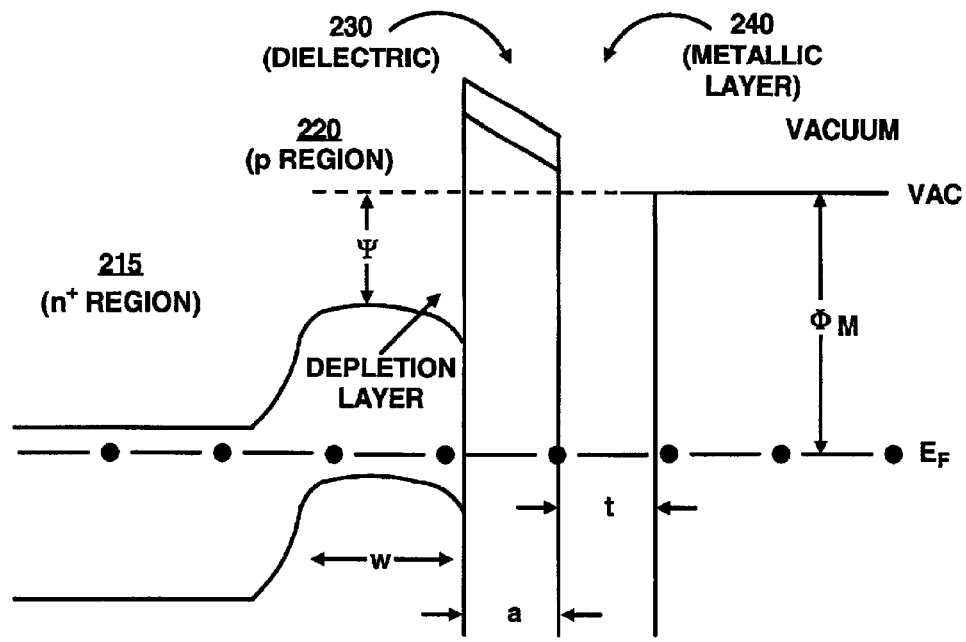
FIG. 3B illustrates an exemplary energy band diagram in equilibrium across the line II'—II' of the embodiment of the cold emitter with n+-p-D-M structure shown in FIG. 2B.
Figure 4B:
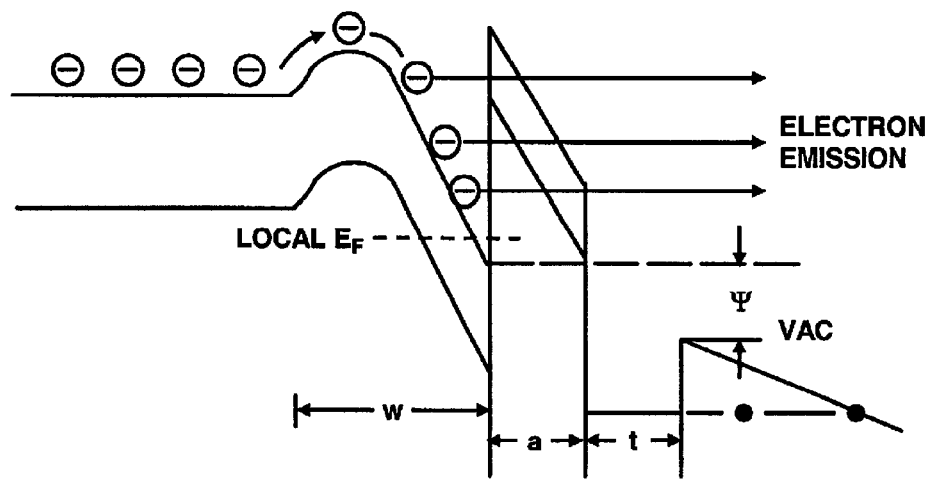
FIG. 4B illustrates an exemplary energy band diagram under bias across the line II'—II' of the embodiment of the cold emitter shown in FIG. 2B.

At least one role of the n+ region 220 is explained with reference to FIGS. 3B and 4B. FIG. 3B illustrates an exemplary energy band diagram in equilibrium of the cold emitter 200-1 of FIG. 2B along the line II'—II'. At equilibrium, a depletion layer is formed at the p-D interface between the p region 330 and the dielectric layer 245.

The operation of the cold emitter 200-1 is similar to the operation of the cold emitter 200. In this instance however, the biasing potential is such that the potential on the metallic layer 240 (via the M electrode 290) is positive relative to the potential on the n+ region 220 (via the n electrode 260). With such bias, the electrons from the electron-rich n+ region 220 are injected into the p region 230, as shown in FIG. 4B. When the thickness W of the of the p region 230 is less than the diffusion length L of the non-equilibrium electrons in the p region 230, the electrons may traverse the p region 230 and accumulate in the depletion layer shown in FIG. 4B until the quasi-local Fermi level rises above the vacuum level Vac. In the depletion layer, the hole concentration is very small, so that electron-hole recombination rate is very small as well. Consequently, electron emission rapidly increases, and the emitted current is much larger than the recombination current. This allows for very large currents to be emitted.

Figure 2C:
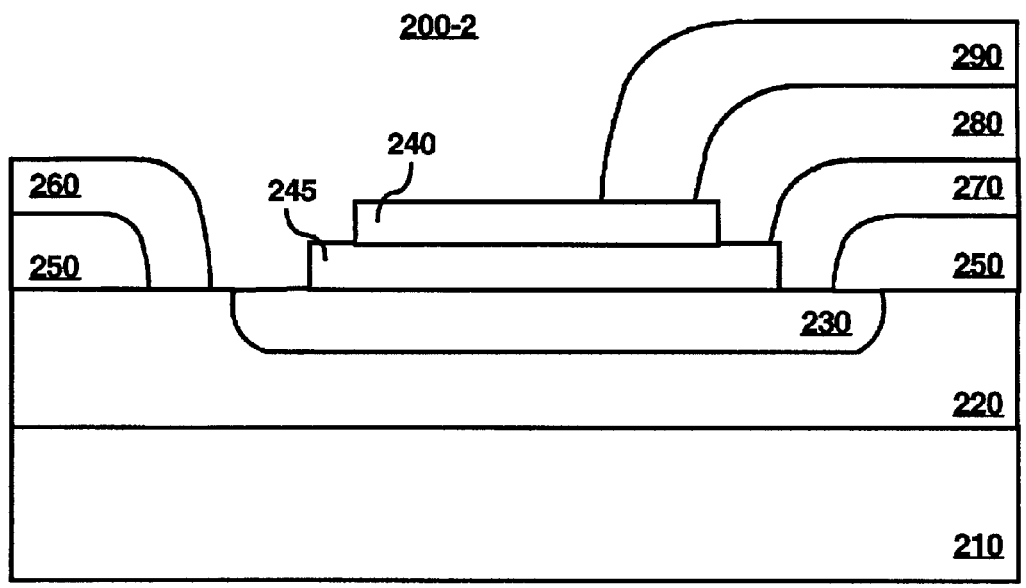

FIG. 2C illustrates an exemplary cross sections of a third embodiments of a cold emitter 200-2 according to an aspect of the present invention. The cold emitter 200-2 may also be described as a variation on the cold emitter 200 of FIG. 2A, and may also generally be characterized as an n+-p-D-M structure due to the presence of the n+ region 220. As shown in FIG. 2C, the cold emitter 200-2 includes all of the elements of the cold emitter 200 shown in FIG. 2A, and further includes an n+ region 220, an n electrode 260, and a second insulator 280 insulating the M electrode 290. For sake of simplicity, elements common to both cold emitters 200 and 200-2 will not be described in detail. It suffices to note that the behavior and the characterizations of the common elements may be similar.

The general operation of the cold emitter 200-2 is similar to the cold emitters 200 and 200-1 and thus need not be discussed in detail. However, in this instance, electron emission is initiated by forward biasing the n+-p junction, i.e. the potential on the p region 230 (via the p electrode 270) is positive relative to the n+ region 220 (via the n electrode 260). The M electrode 290 may be used to control the amount of electron emission. The emission current can be controlled by biasing the potential on metallic layer 240 through the M electrode 290. This closes and opens the emission current from the cold emitter 200-2. This is very advantageous in applications requiring arrays with individually controlled emitters.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. An electron emitter comprising:
   a p region;
   a dielectric layer formed in contact with said p region wherein a thickness of said dielectric layer is such that a dielectric breakdown field $F_b$ of said dielectric layer substantially meets the condition $F_b \leq 1.5*10^7$ V/cm;
   a metallic layer formed in contact with said dielectric layer; and
   means for emitting electrons through said metallic layer.

2. The electron emitter according to claim 1, further comprising:
   a substrate below said p region.

3. The electron emitter according to claim 1 wherein said p region is formed from a semiconductor.

4. The electron emitter according to claim 3, wherein said semiconductor includes at least one of Si, Ge, GaP, InP, InGaAs, and InGaP.

5. The electron emitter according to claim 3, wherein a hole concentration level of said p region ranges substantially between $10^{16}$ and $10^{19}$ cm$^{-3}$.

6. The electron emitter according to claim 1, further comprising:
   a p electrode formed above and making electrical contact with said p region.

7. The electron emitter according to claim 1, further comprising:
   an M electrode formed above and making electrical contact with said metallic layer.

8. The electron emitter according to claim 1, further comprising an n+ region formed above a substrate such that said p region is formed within said n+ region.

9. The electron emitter according to claim 8, wherein an electron concentration level of said n+ region is greater than a hole concentration level of said p region.

10. The electron emitter according to claim 8, wherein said n+ region is formed from materials with wider band gap than said p region.

11. The electron emitter according to claim 8, wherein a thickness of said p region is less than a diffusion length of non-equilibrium electrons in said p region.

12. The electron emitter according to claim 8, wherein a thickness of said metallic layer is on the order of or less than a mean free path for electron energy.

13. The electron emitter according to claim 8, further comprising:
   an n electrode formed above and making electrical contact with said n+ region.

14. The electron emitter according to claim 1, wherein said metallic layer is formed from materials including at least one of Au, Ag, Al, Gd, W, Pt, Ir, Pd and alloys thereof.

15. An electron emitter comprising:
   a p region;
   a dielectric layer formed in contact with said p region wherein a thickness of said dielectric layer is such that a dielectric breakdown field $F_b$ of said dielectric layer substantially meets the condition $F_b \leq 1.5*10^7$ V/cm;
   a metallic layer formed in contact with said dielectric layer; and
   at least one voltage biasing source electrically connected to said p region and said metallic layer such that electrons pass through said metallic layer.

16. The electron emitter according to claim 15, wherein said at least one voltage biasing source is connected such that said electrons tunnel through said dielectric layer prior to passing to said metallic layer.

17. The electron emitter according to claim 15, further comprising at least one of:
   a p electrode formed above and making electrical contact with said p region; and
   an M electrode formed above and making electrical contact with said metallic layer.

18. The electron emitter according to claim 15, further comprising:
   an n+ region such that said p region is formed within said n+ region.

19. The electron emitter according to claim 18, wherein an electron concentration level of said n+ region is greater than a hole concentration level of said p region.

20. The electron emitter according to claim 18, wherein said n+ region is formed from materials with wider band gap than said p region.

21. The electron emitter according to claim 18, wherein a thickness of said p region is less than a diffusion length of non-equilibrium electron in said p region.

22. The electron emitter according to claim 18, further comprising:
   an n electrode formed above and making electrical contact with said n+ region.

23. The electron emitter according to claim 15, wherein a thickness of said metallic layer is on the order of or less than a mean free path for electron energy.

24. An electron emitter comprising:
- a p region wherein an acceptor hole concentration in the p region ranges substantially between $10^{16}$ cm$^{-3}$ and $10^{18}$ cm$^{-3}$;
- a dielectric region formed directly above said p region wherein a thickness of said dielectric region ranges substantially between 1.5 nanometers and 2.0 nanometers and wherein a dielectric breakdown field $F_b$ of said dielectric region substantially meets the condition $F_b \leq 1.5*10^7$ V/cm wherein said dielectric region is formed from materials including at least one of SiO$_2$, Al$_2$O$_3$ and alloys thereof;
- a metallic layer formed directly above said dielectric region wherein a thickness of said metallic layer is less than a range of between 2.0 nanometers and 5.0 nanometers wherein said metallic layer is formed from materials including at least one of Au, Ag, Al, Gd, W, Pt, Ir, Pd and alloys thereof;
- a substrate below said p region; and
- at least one voltage source electrically connected between said p region and said metallic layer such that electrons pass through said metallic layer.

25. The electron emitter according to claim 2, further comprising
- an n region formed above said substrate such that said p region is formed above said n region wherein a donor concentration of said of said n region is greater than the acceptor hole concentration; and
- at least one voltage source electrically connected between said n region and said metallic layer.

* * * * *